United States Patent
Benda et al.

(10) Patent No.: US 7,946,137 B2
(45) Date of Patent: May 24, 2011

(54) LONG PERIOD FIBER BRAGG GRATINGS WRITTEN WITH ALTERNATE SIDE IR LASER ILLUMINATION

(75) Inventors: John A. Benda, Andover, CT (US); Aristotle Parasco, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 1310 days.

(21) Appl. No.: 11/133,593

(22) Filed: May 20, 2005

(65) Prior Publication Data

US 2005/0217321 A1 Oct. 6, 2005

Related U.S. Application Data

(62) Division of application No. 10/039,094, filed on Jan. 2, 2002, now abandoned.

(51) Int. Cl.
C03B 37/10 (2006.01)
(52) U.S. Cl. .......................................... 65/484; 65/529
(58) Field of Classification Search ................... 65/484, 65/528, 392
See application file for complete search history.

(56) References Cited

U.S. PATENT DOCUMENTS

| | | | |
|---|---|---|---|
| 3,836,261 A * | 9/1974 | Clarke | ........................... 356/431 |
| 4,038,062 A * | 7/1977 | Presby | ........................... 65/382 |
| 4,474,427 A | 10/1984 | Hill et al. | |
| 4,725,110 A | 2/1988 | Glenn et al. | |
| 4,807,950 A | 2/1989 | Glenn et al. | |
| 5,042,897 A | 8/1991 | Meltz et al. | |
| 5,048,913 A | 9/1991 | Glenn et al. | |
| 5,061,032 A | 10/1991 | Meltz et al. | |
| 5,104,209 A | 4/1992 | Hill et al. | |
| 5,176,731 A * | 1/1993 | Prast et al. | ........................... 65/485 |
| 5,216,739 A | 6/1993 | Hill et al. | |
| 5,367,588 A | 11/1994 | Hill et al. | |
| 5,388,173 A | 2/1995 | Glenn | |
| 5,411,566 A * | 5/1995 | Poole et al. | ........................... 65/402 |
| 5,478,371 A * | 12/1995 | Lemaire et al. | ................. 65/384 |
| 5,495,548 A | 2/1996 | Bilodeau et al. | |
| 5,502,786 A | 3/1996 | Inniss et al. | |
| 5,694,502 A | 12/1997 | Byron | |
| 5,718,738 A * | 2/1998 | Kohnke et al. | ................... 65/31 |
| 5,813,987 A * | 9/1998 | Modell et al. | ................. 600/473 |

(Continued)

FOREIGN PATENT DOCUMENTS

EP  1 345 050 A1  9/2003

(Continued)

OTHER PUBLICATIONS

Japanese Office Action mailed Oct. 7, 2008.

*Primary Examiner* — John Hoffmann
(74) *Attorney, Agent, or Firm* — Carlson, Gaskey & Olds, P.C.

(57) ABSTRACT

A method of optical fiber manufacture involves the writing of a grating on the fiber using a laser. A first laser beam is directed on a first locality of the fiber having a circumference. A second laser beam is then directed on a second locality circumferentially displaced from the first locality. The first laser beam may be the second laser beam. In this way, a grating is formed on the fiber. The fiber may have a core and a cladding layer. The fiber may also comprise two gratings to form an interferometer.

2 Claims, 8 Drawing Sheets

U.S. PATENT DOCUMENTS

| | | | |
|---|---|---|---|
| 5,873,923 A * | 2/1999 | DiGiovanni | 65/390 |
| 6,003,340 A * | 12/1999 | Borak et al. | 65/392 |
| 6,067,391 A | 5/2000 | Land | |
| 6,073,465 A * | 6/2000 | Oleskevich et al. | 65/390 |
| 6,144,011 A * | 11/2000 | Moss et al. | 219/121.68 |
| 6,169,830 B1 | 1/2001 | Kewitsch et al. | |
| 6,209,356 B1 * | 4/2001 | Cocito et al. | 65/392 |
| 6,252,242 B1 * | 6/2001 | Brunfeld et al. | 250/559.45 |
| 6,282,341 B1 * | 8/2001 | Digonnet et al. | 385/37 |
| 6,385,370 B1 * | 5/2002 | Paek et al. | 385/37 |
| 6,430,342 B1 * | 8/2002 | Kim et al. | 385/37 |
| 6,501,881 B2 * | 12/2002 | Kim | 385/37 |
| 6,509,547 B1 * | 1/2003 | Bernstein et al. | 219/121.68 |
| 6,519,388 B1 * | 2/2003 | Fernald et al. | 385/37 |
| 6,535,669 B2 * | 3/2003 | Berthelot et al. | 385/37 |
| 6,548,225 B1 * | 4/2003 | Hammon et al. | 430/321 |
| 2001/0028769 A1 * | 10/2001 | Deacon | 385/50 |
| 2001/0032884 A1 * | 10/2001 | Ring et al. | 235/454 |

FOREIGN PATENT DOCUMENTS

| | | |
|---|---|---|
| EP | 1 406 098 A1 | 4/2004 |
| JP | 11281825 | 10/1999 |
| JP | 2001015841 | 1/2001 |
| JP | 2001511904 | 8/2001 |
| WO | 98/36296 | 8/1998 |
| WO | PCT/JP02/06868 | 8/2002 |

* cited by examiner

LONG PERIOD FIBER BRAGG GRATINGS WRITTEN WITH ALTERNATE SIDE IR LASER ILLUMINATION

This application is a divisional of U.S. patent application Ser. No. 10/039,094, filed Jan. 2, 2002 now abandoned.

BACKGROUND OF THE INVENTION

The invention relates to a new method of producing an optical diffraction grating for an optical fiber using a $CO_2$ laser.

Optical fibers are used to transmit light for industrial purposes, such as for telecommunications and sensor applications. An optical fiber may comprise a core, a cladding, and a buffer. The core serves as the main transmission media or conduit for the light propagating through the fiber. A cladding layer surrounds the core and, typically, has a different index of refraction than the media of the conduit. The cladding may serve as another conduit for transmitting light. The buffer layer, which surrounds the core layer and the cladding layer, may be used to extinguish light in the cladding layer.

A single mode telecommunication fiber may comprise a core of fused silica, roughly 8 μm in diameter, doped to increase its index of refraction, surrounded by a cladding layer, 125 μm in diameter, of fused silica and a polymer buffer, 240 μm in diameter. Cladding modes are normally extinguished by the buffer but will propagate when the buffer is removed. While a single mode fiber has only a single core mode propagating in the forward direction, the fiber has numerous discrete cladding modes of light propagating in the cladding layer.

For certain applications, an optical fiber may have a light grating, such as a Bragg grating. In particular, such a grating is useful for various telecommunications applications. Moreover, such a fiber may be used as a sensor due to its sensitivity to temperature, pressure, and the index of refraction of the fiber's environment.

Generally, a Bragg grating in an optical fiber comprises a periodic variation in the fiber's physical state, such as an alteration in the index of refraction or ablation or removal of portions of the fiber, that may convert guided radiation in the fiber's core into another guided mode in the fiber or, in some cases, unguided radiation, which escapes from the fiber. Bragg gratings may have two forms: short period Bragg gratings and long period Bragg gratings. Short period Bragg gratings are normally used to retro-reflect the guided core mode in a single mode fiber into the core mode propagating in the reverse direction. Long period Bragg gratings convert the core mode into cladding modes.

A Bragg grating converts light from one mode to another guided mode or an unguided mode within a narrow range of wavelengths, so-called resonant wavelengths.

As known, the resonant wavelengths are determined by the grating equation:

$$2\pi/\hat{\ } = |\beta_2(\lambda) - \beta_1(\lambda)|,$$

where $\hat{\ }$ is the grating period, $\beta_1$ is the propagation constant of the initial core mode, and $\beta_2$ is the propagation constant of the outgoing mode. Propagation constants define the axial variation in phase of the guided mode and are functions of wavelength.

A Bragg grating for an optical fiber is most commonly made by directing a laser on one side of a fiber with a periodic distribution of ultraviolet light from an excimer laser. The process only works with silica fibers whose core index has been raised by doping with germania. Illuminating germania doped silica with ultraviolet radiation of a certain wavelength alters its index of refraction. The alteration of the index of refraction is then the mechanism responsible for grating formation.

The grating is normally produced using a mask as a stencil. The process is enhanced by hydrogenating the fiber prior to the fabrication of the grating. The hydrogenation consists of exposing the fiber to high-pressure hydrogen at an elevated temperature, a potentially hazardous procedure. After illumination with the ultraviolet radiation, the fiber must then be "baked" to expel the hydrogen and stabilize the grating. The resonance wavelength of the grating changes somewhat as a result of this baking. Gratings have also been formed with a $CO_2$ laser and a fusion splicer but published results appear to be inferior to that obtained with a photorefractive grating generated by ultraviolet radiation.

A need therefore exists for a technique of creating a grating in an optical fiber in a safe and effective manner.

SUMMARY OF THE INVENTION

The invention comprises a technique to manufacture optical fibers using a laser to create an optical grating on the fiber. In contrast to the prior art, the laser is first directed on a first spot on the fiber and then directed on a second spot radially displaced relative to the fiber from the first spot. In other words, the laser is shined on one side and then the other side of the fiber. The fiber alters locally at each spot to create a uniform grating.

The laser may heat and deform the spot on the optical fiber to form the grating. An infrared laser, such as the radiation from a $CO_2$ laser, may serve to deform the fiber. The laser may be scanned across the fiber and activated at predetermined points of the scanning pattern. In this way, the alteration of the fiber is consistent, producing a more efficient grating.

Moreover, the grating may be formed on an optical fiber having a transmission layer and a cladding layer. Two gratings spaced apart may be formed so as to form an optical fiber for sensor application purposes. One grating serves to eject light from the core into the cladding layer. The second grating returns light from the cladding layer to the core. Light from the cladding layer now in the core interferes with the light propagating through the core. The combined light reveals details about the environment surrounding the fiber.

An optical fiber made from the foregoing process is more accurate than an optical fiber made from many existing techniques. Modes of light traveling through the cladding layer are better defined. The method is also relatively safe.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
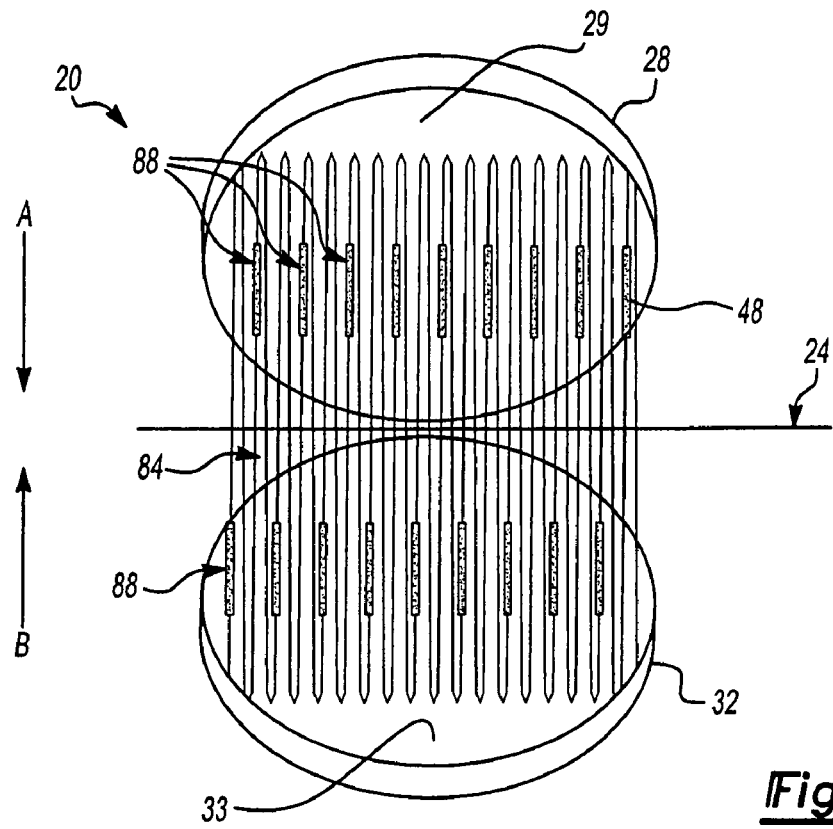
FIG. 1 illustrates an embodiment of the invention, including optical fiber and laser.
Figure 1A:
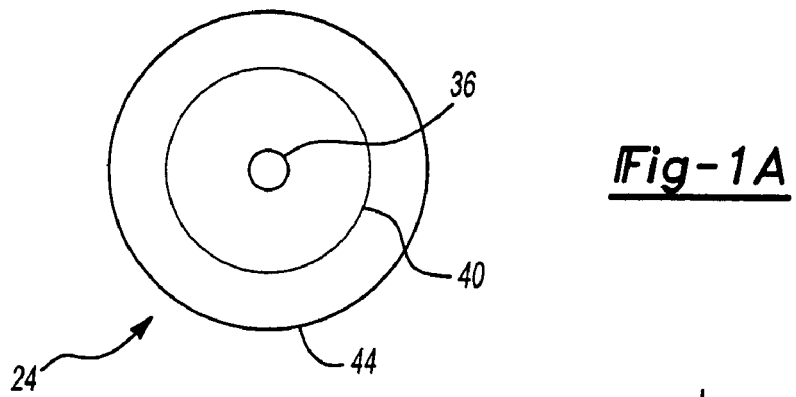
FIG. 1A illustrates the optical fiber of FIG. 1, detailing a core, a cladding layer, and a buffer layer.
Figure 1B:
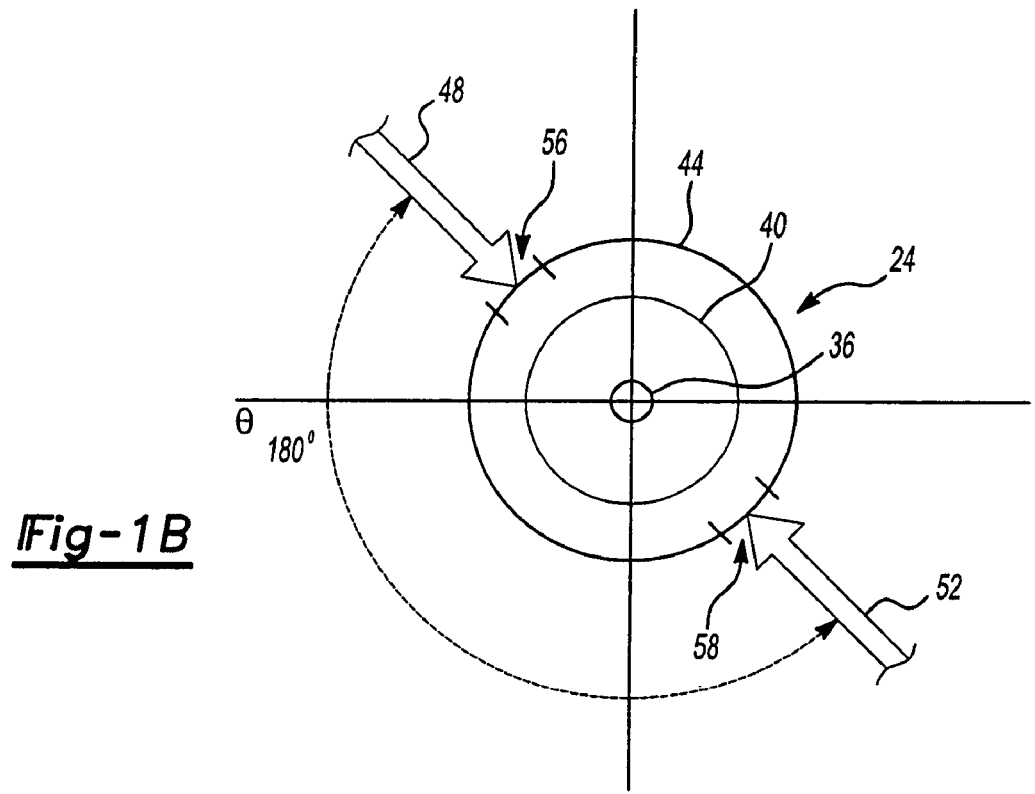
FIG. 1B illustrates an alternative view of the optical fiber of FIG. 1.
Figure 1C:
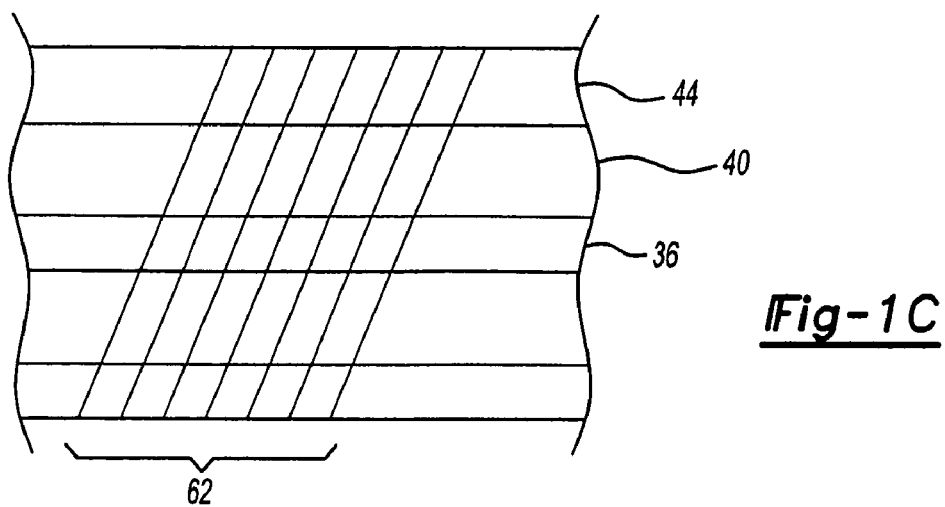
FIG. 1C illustrates a side view of the optical fiber of FIG. 1, showing a schematic representation of the grating.

FIG. 1 illustrates grating formation technique 20, involving optical fiber 24 spaced between two turning mirrors, 28 and 32. As illustrated in FIG. 1A, optical fiber 24 comprises core 36, cladding 40, and buffer 44, which are all manufactured by known processes. Generally, light is principally transmitted through core 36 and alternatively through cladding 40. Buffer 44 extinguishes light modes. As shown in FIG. 1B, in contrast to existing techniques, grating formation technique 20 involves directing laser beam 48 on first locality 56 and then directing laser beam 52 on second locality 58 that is circumferentially displaced from first locality 58. Laser beam 48 and laser beam 52 may comprise a laser from the same source. Here, first locality 56 is displaced angularly from second locality 58 by an angle θ, preferably 180 degrees. In this way, grating 62 may be formed on core 36, cladding 40, and buffer 44, as illustrated schematically in FIG. 1C.

Figure 3:
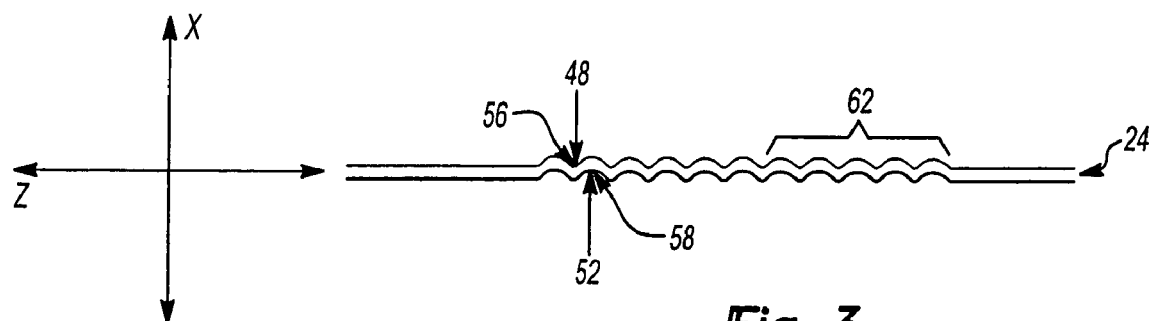
FIG. 3 illustrates an overhead view of the optical fiber, including the direction of the laser of FIGS. 1 and 2.

As illustrated in FIG. 3, first locality 56 is also displaced axially at regular intervals, along the Y-axis, from second locality 58. The process is repeated down the length of optical fiber 24 to form a grating. Laser beam 48, 52 may comprise an infrared beam from a focused infrared source, a beam whose wavelength is outside the range transmitted by fused silica, such as a $CO_2$ laser. Laser beam 48, 52 heats optical fiber 24, tending to deform the fiber locally into microbends 62, as shown in FIG. 3. Laser beam 48, 52 may leave residual strains in the fiber with a local refractive index change.

Grating formation technique 20 may produce a grating composed of microscopic bends 62 as shown schematically in FIG. 3. Microbends 62 may be formed on optical fiber 24, including core 36, cladding 40, and buffer 44 and may comprise a generally symmetric sinusoidal shape in optical fiber 24. This technique has the potential to form gratings in fibers without germania-doped cores and without hydrogenation.

In previous work using a $CO_2$ laser, the fiber was illuminated on only one side, i.e. spots axially displaced but not radially displaced from each other. Substantial one-sided curling of the fiber occurred, resulting in less than an efficient grating. The resulting radiation pattern produced in the cladding by the grating is not identifiable as any well-defined cladding mode. Indeed, no images of cladding modes have been published in previous work. Grating formation technique 20 may take advantage of curling to form a symmetric grating as shown in FIG. 3.

Figure 2:
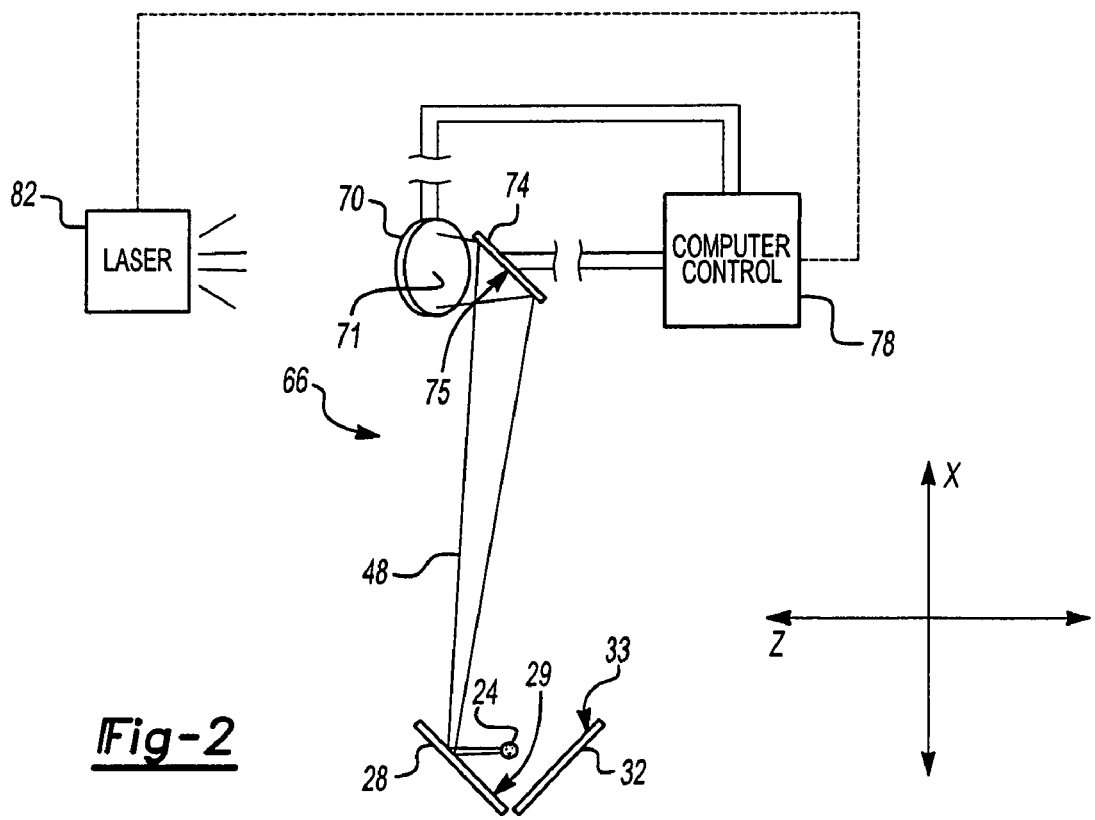
FIG. 2 illustrates an alternative view of the embodiment of FIG. 1, showing optical fiber, laser, scanning mirrors, and turning mirrors.

FIG. 2 illustrates computer-controlled scanning system 66 to direct laser beam 48 generally along an axis, say Z-axis, on optical fiber 24 on one side and then the other at regular spaced intervals along the fiber's length. Localities, for example first locality 56 and second locality 58, on opposite sides of fiber 24, are separated by one-half the bending pattern period as shown in FIG. 3.

Two scanning mirrors, first scanning mirror 70 and second scanning mirror 74, are used to raster laser beam 48 across optical fiber 24 in conjunction with first turning mirror 28 having reflective face 29 and second turning mirror 32 having reflective face 33. Reflective face 29 partially faces reflective face 33. Both first turning mirror 28 and second turning mirror 32 are positioned at roughly 45 degrees in relation to the Z-axis shown on either side of optical fiber 24. Computer control 78 operatively controls scanning mirrors 70, 74 through known mechanisms and controls to direct laser beam from laser 82 to trace scanning pattern 84, a square pattern with rounded corners to facilitate a smooth change in direction of the scanning mirror, across reflective face 29 and reflective face 33 as seen in FIG. 1. Other scanning patterns may be employed as known.

First scanning mirror 70 has reflective face 71 while second scanning mirror 74 has reflective face 75. Reflective face 71 partially faces reflective face 75. As further shown in figure, laser beam 48 is activated at the appropriate time, in darkened portions 88 of sinusoidal pattern, to illuminate optical fiber 24 alternately on either side and preferably not on the top of the fiber.

FIG. 2 shows also the placement of optical fiber 24 between turning mirrors, 28 and 32, and below scanning mirrors, 70 and 74. FIG. 1 shows the actual path of laser beam 48 as viewed from above and the portions of the path in which laser 82 is activated. In darkened portions 88, laser beam 48 is always turned on with the rapidly moving scanning mirror moving in the same direction, so that on one side of optical fiber 24 is scanned from top to bottom (along direction of arrow A), while on the other side optical fiber 24 is scanned from bottom to top (along direction of arrow B). This is important to produce a more symmetric pattern, since the fiber gets hotter as the beam moves across it.

It is also preferable that the laser beam not be tightly focused on the fiber because a tightly focused laser spot tends to ablate the fiber. The spot size on the locality of the fiber may be chosen to be roughly half the period of the desired bending pattern to give a more sinusoidal undulation of the fiber. The grating period ˆ, as well as the resulting spectral resonance, is varied by simply altering the spacing between the scanning lines.

A grating composed of microscopic bends in a fiber, as seen in FIG. 3, can be expected to produce asymmetric cladding modes, that is, with an azimuthal number of 1. In a circular coordinate system, the amplitude of the cladding mode varies as $\cos\theta$ or $\sin\theta$ and the intensity pattern as $\cos^2\theta$ or $\sin^2\theta$. (Other azimuthal numbers would result in an intensity pattern varying as $\cos^{2\nu}\theta$ or $\sin^{2\nu}\theta$.) The low order cladding modes can be approximated by what are known in the art as LP modes. The modes are characterized by increasing number of rings as the mode number increases.

Figure 4A:
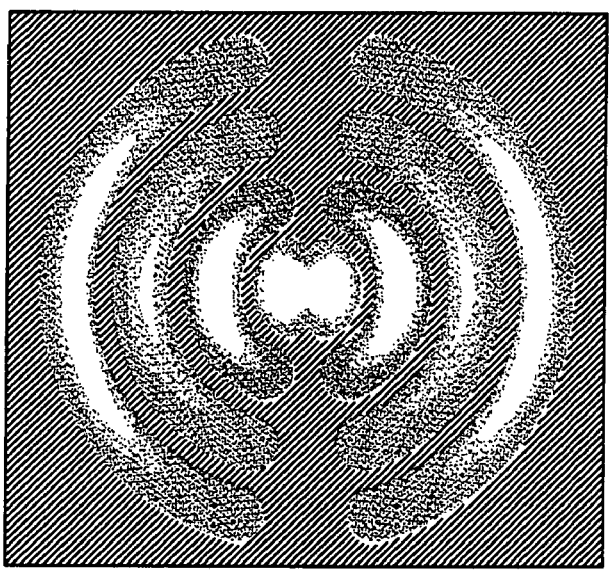
FIG. 4A illustrates a model transmission of light through an optical fiber, showing the transmission of light through the core and cladding layers.
Figure 4B:
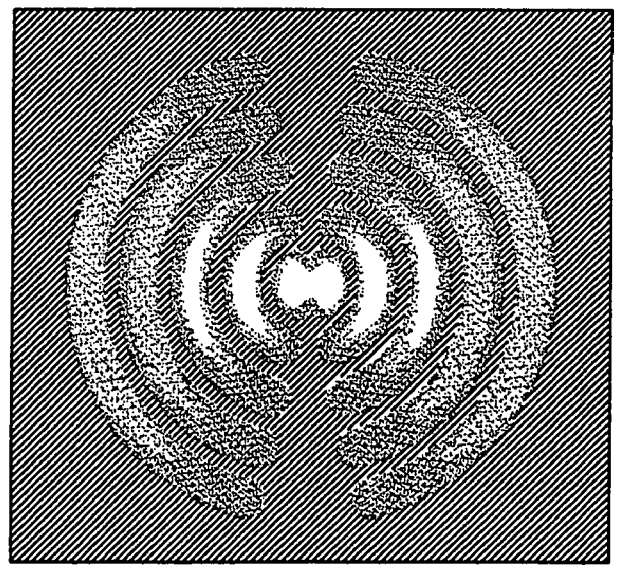
FIG. 4B illustrates a model transmission of light through an optical fiber, showing the transmission of light through the core and cladding layers.

FIGS. 4A and 4B show a model intensity profile in the cross-section of an optical fiber for the LP14 and LP15 modes, respectively. Asymmetric mode gratings are difficult to produce with excimer-laser produced photorefractive gratings because the grating must be steeply blazed. That is, the grating lines are closely spaced and nearly parallel to the fiber core.

Figure 5:
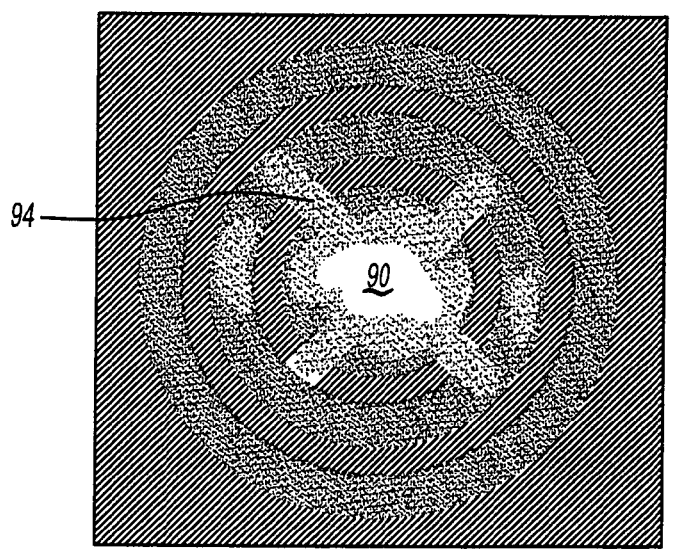
FIG. 5 illustrates the transmission of light through an optical fiber having a grating made from the inventive technique.
Figure 8:
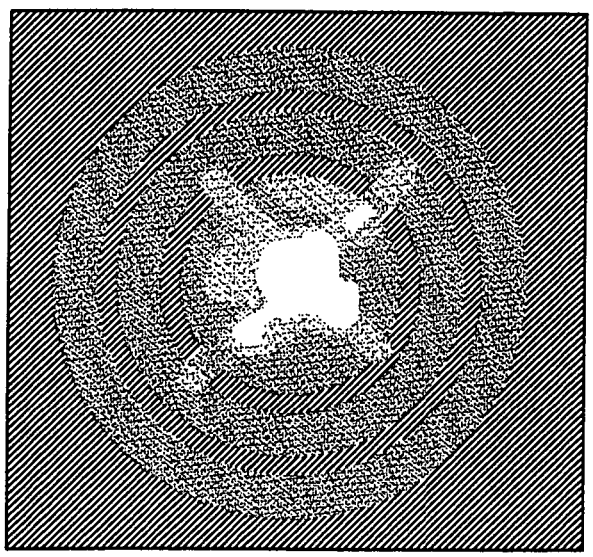
FIG. 8 illustrates the transmission of light through an optical fiber having a grating made from the inventive technique.
Figure 11:
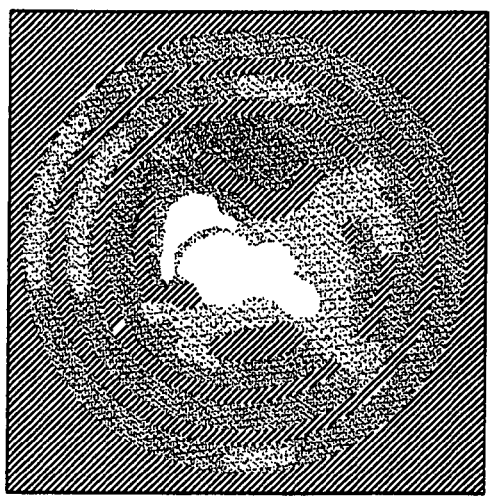
FIG. 11 illustrates the transmission of light through an optical fiber having a grating made from the inventive technique.

FIGS. 5, 8 and 11 show experimentally produced images of cladding modes generated with gratings produced from grating formation technique 20. FIGS. 5 and 8 show images that appear to be good approximations for LP14 modes. FIG. 11 shows an early attempt to generate an LP15 mode. In the latter case, a poor cleave of the fiber end resulted in a distorted image, but five rings are clearly recognizable.

Figure 6:
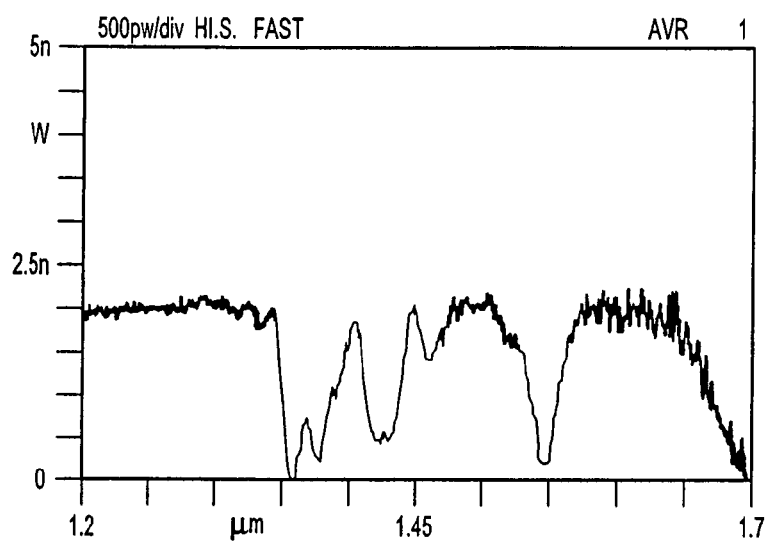
FIG. 6 illustrates a spectral analysis of light through the optical fiber of FIG. 5.
Figure 9:
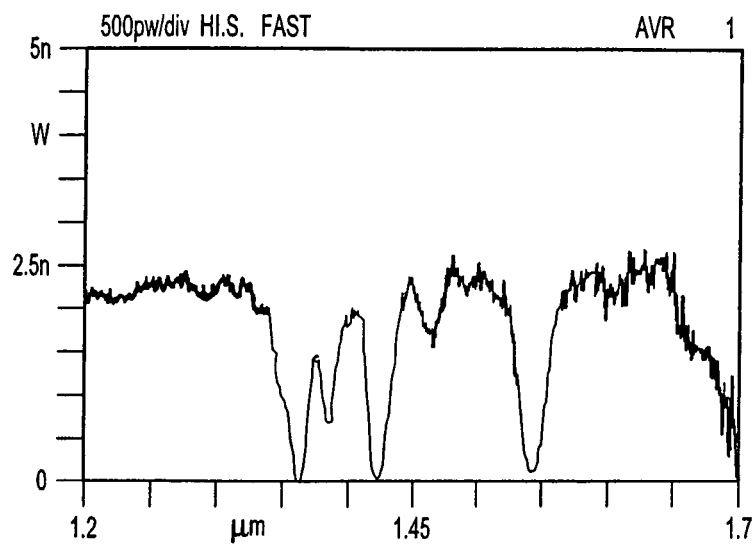
FIG. 9 illustrates a spectral analysis of light through the optical fiber of FIG. 8.
Figure 12:
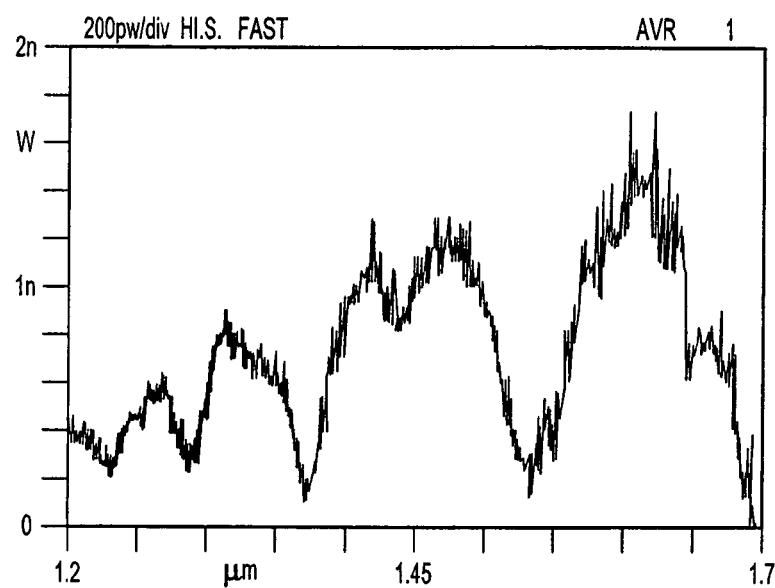
FIG. 12 illustrates a spectral analysis of light through an optical fiber of FIG. 11.

Also shown with these figures are spectral analyses of white light transmitted through the gratings of the foregoing optical fibers (see FIGS. 6, 9, 12). Transmitted power is plotted versus wavelength. In each of these figures, resonances associated with the grating are clearly visible including one near a wavelength of 1.55 μm. The spectrum of the white light source, transmitted through each fiber before the grating was written, is shown for comparison. The cladding mode images were generated with a laser at a wavelength of 1.55 μm, which is near the resonance of interest. The LP14 gratings were 3 cm long. The LP15 grating was 2 cm long.

Figure 7:
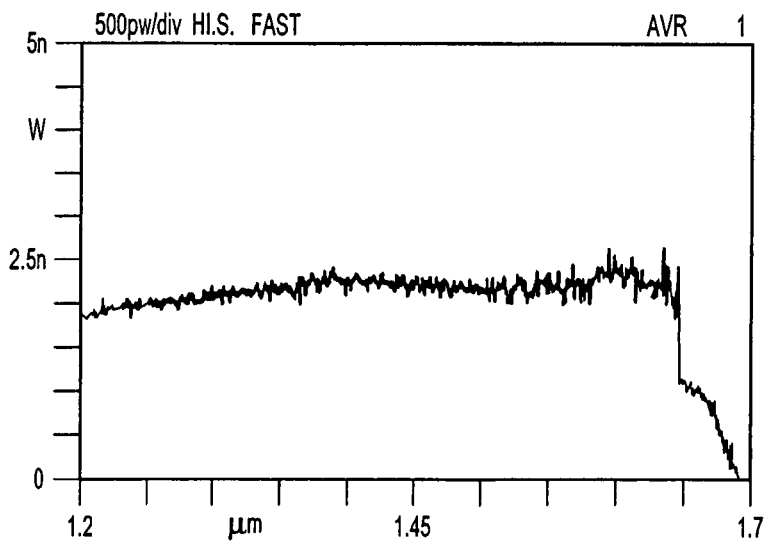
FIG. 7 illustrates a spectral analysis of light through an optical fiber similar to the fiber of FIG. 6 without a grating.

FIG. 6 shows a spectral analysis of white light transmitted through the optical fiber of FIG. 5, which shows white light transmitted through core 90 and cladding 94. FIG. 7 is a spectral analysis of the white light through a similar fiber without a grating. As seen in FIGS. 6 and 7, the cladding mode appears to be an LP14 with lobes oriented horizontally.

Figure 10:
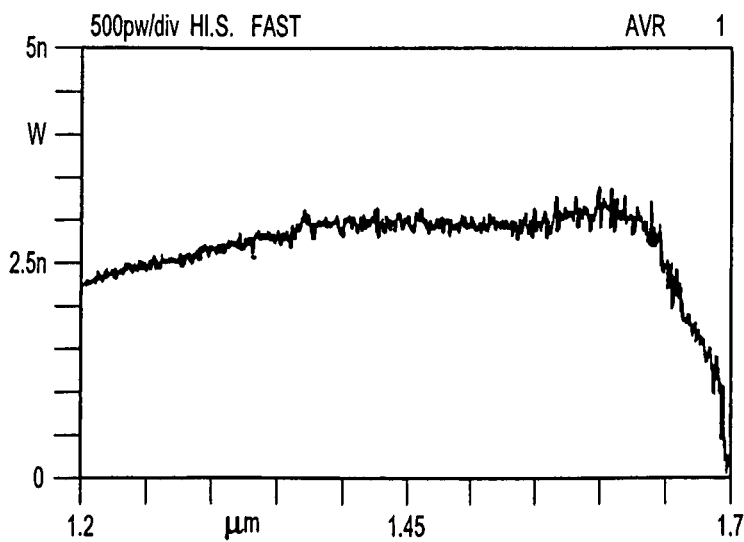
FIG. 10 illustrates a spectral analysis of light through an optical fiber similar to the fiber of FIG. 8 without a grating.

FIG. 9 shows a spectral analysis of white light transmitted through the optical fiber of FIG. 8 with a grating. FIG. 10 shows the spectral analysis of the white light through a similar fiber without a grating. The cladding mode appears to be close to an LP14 with the lobes oriented about 60 degrees to the horizontal.

Figure 13:
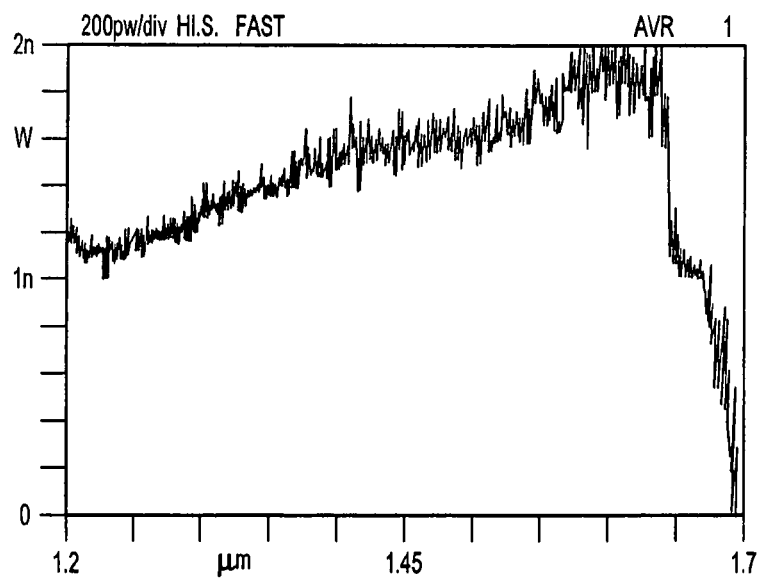
FIG. 13 illustrates a spectral analysis of light through an optical fiber similar to the fiber of FIG. 11 without a grating.

FIG. 12 shows a spectral analysis of white light transmitted through the optical fiber of FIG. 11 with a grating. FIG. 13 shows the spectral analysis of the white light through a similar fiber without a grating. Although FIG. 11 shows a distorted image due to a bad fiber cleave, the cladding mode has five identifiable rings and is likely an LP15 mode.

Figure 14:
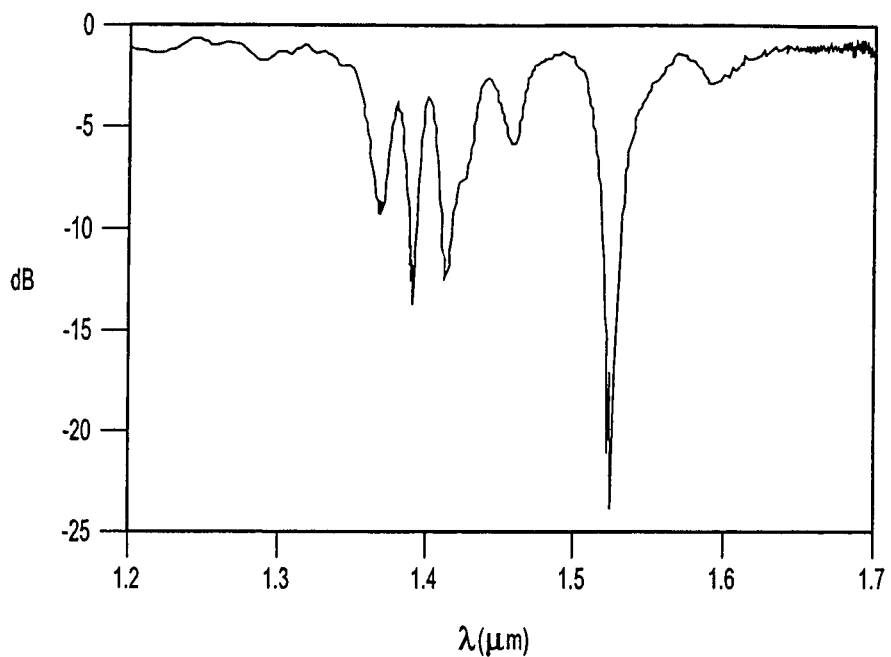
FIG. 14 illustrates a spectral analysis of light through an optical fiber having a grating made from the inventive technique.

The LP14 grating resonances near 1.55 μm in FIGS. 5 and 8 are more than 90% deep. FIG. 14 shows the transmission of a similarly written grating on a logarithmic scale. It shows that it is possible to get resonances more than 20 dB deep (99%). The gratings with the deepest resonances tend to generate cladding modes that are not as well formed as those shown above, but optimizing the process may improve this result. Variations in parameters such as spot size on the fiber, scan speed, and laser power may alter results.

Previous work with $CO_2$ laser produced gratings, in which the fiber was illuminated on only one side, resulted in gratings that produced by an index increase in the core, as with excimer-laser produced gratings. That process is enhanced by hydrogenation. This index increase results in a shift in the resonant wavelength towards longer wavelengths as the grating is formed, that is, as the average index of the core and the grating strength are increasing. This results primarily from a shift in the propagation constant of the core mode with increasing code index.

With gratings written with a $CO_2$ laser, using alternate side illumination as described above, the shift with increasing grating strength is towards shorter wavelengths. The mechanism of grating formation may be different than that of excimer-laser produced gratings. It may be the result of the formation of microscopic bends or microbends as seen in FIG. 3.

Figure 15:
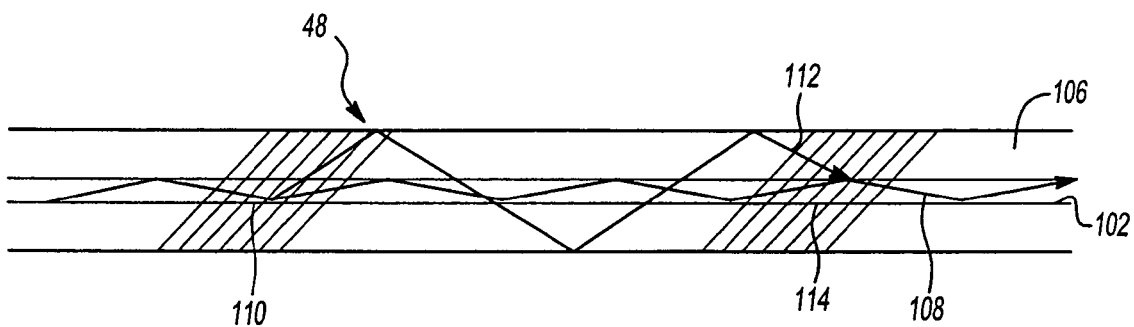
FIG. 15 illustrates a sensor, a Mach-Zehnder interferometer, showing a schematic representation of the grating made from the inventive technique.

A Mach-Zehnder interferometer may be formed using gratings written from the technique described above as shown in FIG. 15. Such a device is useful as a sensor or a switch. Interferometer 98 comprises core 102 and cladding 106. Light 108 propagates through core 102. First grating 110 ejects light 108 into cladding 106. Ejected light 112 returns to core 102 through second grating 114, where ejected light 112 interferes with light 108 that remains behind in core 102. This interference produces interference fringes.

Figure 16:
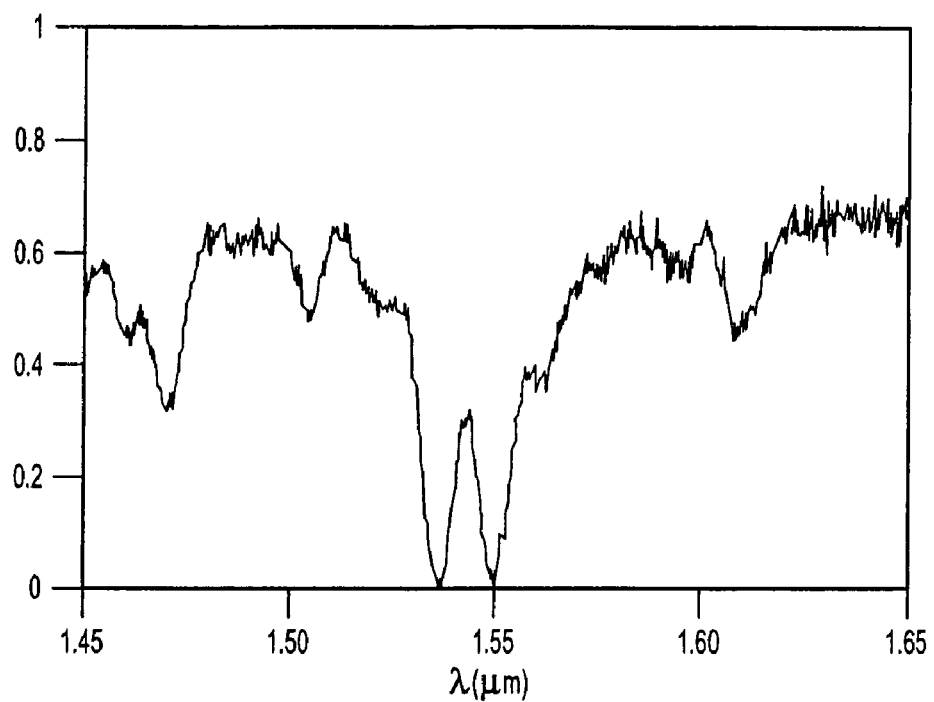
FIG. 16 illustrates a spectral analysis of light through a Mach-Zehnder interferometer employing a grating made from the inventive technique.
Figure 17:
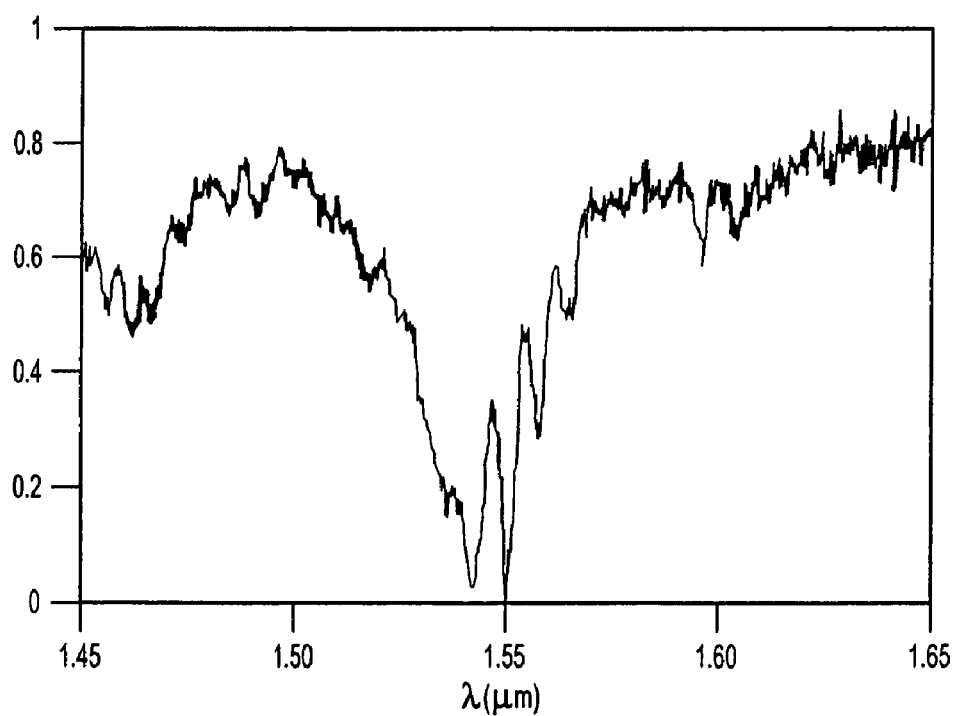
FIG. 17 illustrates a spectral analysis of light through a Mach-Zehnder interferometer employing a grating made from the inventive technique.

To get high fringe visibility requires cladding modes to propagate without significant distortion. FIGS. 16 and 17 shows the results of light transmitted through interferometer 98. As seen in these figures, fringes are clearly evident, but, significantly, less than 100% of the light is returned to the core, at the center of the resonance. However, this grating is superior to other gratings produced using different techniques. Indeed, grating formation technique 20 permits the quick writing of long period Bragg gratings using a $CO_2$ laser. The grating period can be easily changed, since the process does not involve using masks. Hydrogenation of the fiber is not required. Consequently, no after baking is required. A lower cost, more efficient laser, is used. Asymmetric cladding modes are produced, which are difficult to achieve with excimer laser produced photorefractive gratings.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A system for optical fiber manufacture, comprising:
   a laser source;
   an optical fiber, having a circumference and an axis;
   a first turning mirror having a first reflective face for receiving a first laser beam from said laser source and for reflecting said first laser beam on said optical fiber;
   a second turning mirror having a second reflective face for receiving a second laser beam from said laser source and for reflecting said second laser beam on said optical fiber, wherein said optical fiber is disposed between said first turning mirror and said second turning mirror;
   a scanning mirror for directing said first laser beam onto said first turning mirror and for directing said second laser beam onto said second turning mirror; and
   a computer linked to said scanning mirror and to said laser source, said computer configured to control said scanning mirror and said laser source, wherein said computer is configured to control said scanning mirror to direct said first laser beam on a first locality of said optical fiber and to direct said second laser beam on a second locality of said optical fiber, said first locality circumferentially and axially displaced from said second locality.

2. The system of claim 1 wherein said first locality is spaced one-half a bending pattern period from said second locality.

* * * * *